Patented Aug. 29, 1939

2,170,949

UNITED STATES PATENT OFFICE 2,170,949

PROCESS OF PREPARING ADHESIVE SHEETS

Willard L. Morgan, Hammond, Ind., assignor to Sylvania Industrial Corporation, Fredericksburg, Va., a corporation of Virginia No Drawing. Application June 23, 1936, Serial No. 86,808

13 Claims. (Cl. 91—68)

The invention relates to a composition of matter, especially one containing rubber. More particularly, it relates to an adhesive material and pertains to normally tacky, pressure adherent adhesive sheets and to rubber adhesive compositions that may be utilized in the production thereof.

The heretofore known rubber adhesives or cements, however they may have been produced, have been characterized by the more or less pronounced odor characteristic of rubber. This odor is ascribed to the presence in the rubber of amino compounds, and it has not been possible, heretofore, to produce an adhesive substantially free therefrom. The presence of this disagreeable odor renders rubber adhesives unsuitable for use on tapes and laminated wrapping blanks for the packing of tobacco and food products.

It has also been found impossible to obtain from the hitherto known pressure sensitive adhesive compositions a thin, clear and transparent coating which is quite essential in making transparent adhesive tapes. Ethyl and methyl alcohols are the only suitable solvents known which have the power of decreasing the viscosity of thick ordinary rubber cements. These solvents, however, partially coagulate or precipitate the rubber and give cloudy films or coatings.

An object of the invention is to obviate the foregoing and like disadvantages characterizing the previous products.

A further object of the invention is to provide a pressure-adherent adhesive sheet or tape that is normally removable and reuseable, and characterized by having on one surface a coating of a normally tacky, substantially odorless, rubber base adhesive composition.

It is also an object of the invention to provide a composition of matter having a rubber as a base which is substantially free from the odor characteristic of rubber.

An additional object of the invention is to provide an adhesive composition having a rubber as a base which is substantially free from the odor characteristic of rubber; is transparent, and of a relatively light color.

Another object of the invention is to provide an adhesive composition having a rubber as a base which is relatively non-viscous; is transparent, and of a relatively light color.

Other objects of the invention will in part be obvious and will in part appear hereinafter.

The invention accordingly comprises a novel product possessing the characteristics, properties and relation of constituents and an article having the elements and the relation of elements all as exemplified in the following detailed disclosure, and the scope of the invention will be indicated in the claims.

I have found that the odor of rubber may be substantially eliminated or decreased to an unobjectionable degree by incorporating with a rubber composition a quantity of phthalic acid. Thus by the use of a small quantity of such substance in the adhesive, tapes and wrapping blanks having a rubber adhesive may be employed for the wrapping of tobacco and food products, as well as a large number of commercial and industrial applications which were formerly closed to the use of rubber adhesives on account of their objectionable odor.

I have also found that a relatively non-viscous rubber adhesive composition giving a thin, clear and transparent pressure-sensitive adhesive coating may be obtained by the addition, to suitable rubber cement, of halogen substitution products of aliphatic ethers as solvents for the rubber and, in particular, by the addition of di-halogen substituted ethyl ether.

In the practice of the invention, the backing may consist of a flexible sheet or film, preferably of a non-fibrous, homogeneous material, e. g. regenerated cellulose, cellulose esters, as nitrocellulose and cellulose acetate; cellulose ethers, as ethyl cellulose and benzyl cellulose; synthetic plastics, as polymerized vinyl resins; casein, gelatin and the like.

The above backing materials may have a moistureproofing composition applied to one or both sides thereof and preferably only on the side opposite to that to which the adhesive is applied. It is preferable, however, to apply a superficial coating of wax to the side opposite to that to which the rubber adhesive is applied. Such a wax coating will prevent the adhesive film from sticking to the adjacent backing layer in a roll of the adhesive material.

These materials are characterized in their preferred form by being transparent, flexible, of relatively high tensile strength, and capable of being produced in sheet form, having a thickness as low as eight ten-thousandths of an inch. Such non-fibrous, homogeneous materials provide a satisfactory surface for the adhesive which is so strongly bound thereto that the novel adhesive sheets are removable and reuseable.

The composition may comprise a rubber, a resin and a deodorizing ingredient comprising phthalic acid. For a composition having high transparency and light color, a pale crepe rubber of high purity is utilized along with di-halogen substituted ethyl ether as a solvent. Part or all of the pale crepe rubber may be replaced by other forms of natural rubber, reclaimed rubber or rubber latex. It may be mentioned that the selection of a rubber is preferably made with regard to its odor, in view of the fact that the more pronounced the odor, the larger the quantity of deodorizing ingredient required.

As a resin, use is preferably made of ester gum, but satisfactory results may be obtained with high grade gum dammar, cumar resin and rosin, these being referred to hereinafter collectively under the term "resin".

If desired, a small amount of a solid inorganic material having a refractive index in visible light substantially of the same degree as that of the rubber may be added to the composition above given. For example, there may be employed bolted magnesium carbonate up to about 5% by weight. The magnesium carbonate should be free of grit, silica or other solid particles which might reduce the transparency of the adhesive film.

The crepe rubber, resin, deodorizing ingredient and optional ingredients as desired may be dispersed in a suitable medium such, for example, as gasoline, benzene or a mixture of gasoline and benzene with or without a small amount of di-halogen substituted ethyl ether.

By way of illustrating, but not by way of limiting the invention, the several solid ingredients of the novel adhesive composition herein disclosed may be employed in the following proportions, given in parts by weight

| | |
|---|---|
| Pale crepe rubber | 60–70 |
| Resin | 25–35 |
| Deodorizing ingredient | 0.1–1 |

The several ingredients of the novel adhesive solvent herein disclosed may be employed in the following proportions, given in parts by weight:

| | |
|---|---|
| Gasoline | 70–80 |
| Benzene | 20–25 |
| bb' dichloroethylether | 4–10 |

As examples of suitable compositions which may be prepared according to this invention, there may be given the following, the ingredients being in parts by weight:

| | I | II | III | IV | V | VI |
|---|---|---|---|---|---|---|
| Rubber | 19 | 26 | 19 | 26 | 19 | 26 |
| Resin | 9 | 12 | 9 | 12 | 9 | 12 |
| Magnesium carbonate | 1.5 | 2 | 1.5 | 2 | 1.5 | 2 |
| Phthalic acid | 0.25 | 0.2 | 0.25 | 0.2 | | |
| Benzene | 17 | 15 | 17 | 14 | 17 | 15 |
| Gasoline | 52 | 45 | 50 | 47 | 49 | 46 |
| bb' dichloroethylether | | | 3.2 | 3.7 | 3.2 | 2.9 |

The above solutions will be sufficiently fluid to be readily applied to the backing material by known methods such, for example, as by passing a sheet or web over a coating roll or under a doctor blade. The coated material may then be passed through a suitable drying chamber wherein the solvents are evaporated, preferably at an elevated temperature. The freshly coated and dried material is then aged, preferably for 24 hours.

In addition to its use in the production of adhesive tapes, the novel adhesive composition may be applied to any suitable backing for subsequent use as a mask or other adhesive sheet, or it may be utilized in laminating sheet materials, in veneering, and in the fabrication of shoes, rugs and other articles of manufacture.

It will thus be seen that by means of the present invention there have been provided novel compositions having improved and technically important properties which may be economically and easily prepared and used, and since certain changes may be made in the above mentioned products and different embodiments of the invention could be made without departing from the scope thereof, it is intended that all matter contained in the above description shall be interpreted as illustrative and not in a limiting sense. It is also to be understood that, in the claims, ingredients recited in the singular are intended to include compatible mixtures of such ingredients wherever the sense permits.

Having described my invention, what I claim as new and desire to secure by Letters Patent is:

1. A process of producing an odorless pressure-sensitive adhesive sheet material which comprises coating a flexible sheet material with a composition comprising rubber, a resin, and phthalic acid, in a suitable solvent, and subsequently evaporating the solvent.

2. A process of producing an odorless pressure-sensitive adhesive sheet material which comprises coating a flexible non-fibrous, cellulosic sheet with a composition comprising from about 60% to 70% pale crepe rubber, from 25% to 35% of a resin, and from about 0.1% to 1.0% of phthalic acid, in a suitable solvent, and then evaporating the solvent.

3. A process of producing a pressure-sensitive adhesive material which comprises coating a flexible, non-fibrous, cellulose sheet material with a composition comprising pale crepe rubber, a resin, magnesium carbonate in a solvent mixture which comprises benzene, gasoline and di-halogen substituted ethyl ether, and evaporating the solvent.

4. A process of producing a pressure-sensitive adhesive material which comprises coating a flexible sheet of regenerated cellulose with a composition comprising pale crepe rubber and a resin, dissolved in a solvent comprising benzene, gasoline and bb' dichloroethylether, and evaporating the solvent.

5. A process of producing an odorless pressure-sensitive adhesive material which comprises coating a flexible sheet of regenerated cellulose with a composition comprising rubber, a resin and phthalic acid, dissolved in a solvent mixture comprising benzene, gasoline and bb' dichloroethylether, and evaporating the solvent.

6. A process of producing a transparent pressure-sensitive adhesive tape which comprises applying to a sheet of transparent regenerated cellulose a thin transparent film of a composition comprising pale crepe rubber, a resin and magnesium carbonate in a solvent mixture comprising benzene, gasoline and bb' dichloroethylether, and evaporating the solvent.

7. A composition of matter, comprising rubber and a deodorant substance comprising phthalic acid, said composition being substantially free from the odor characteristic of rubber and of the odor of the deodorant.

8. A composition of matter comprising rubber, and from about 0.1% to 1% by weight of a deodorant substance comprising phthalic acid, said composition being substantially free from the odor characteristic of rubber and of the odor of the deodorant.

9. An adhesive composition comprising rubber, a resin, a solvent mixture containing benzene and gasoline and from about 0.1% to 1% by weight (based on the solids) of a deodorant substance comprising phthalic acid, said composition apart from the solvent being substantially free from the odor characteristic of rubber and of the odor of the deodorant.

10. An adhesive composition comprising about 60% to 70% pale crepe rubber, about 25% to 35% of a resin and from about 0.1% to 1% of a deodorant substance comprising phthalic acid, said composition being substantially free from the odor characteristic of rubber and of the odor of the deodorant.

11. An adhesive composition comprising about 60% to 70% pale crepe rubber, about 25% to 35% of a resin, 1% to 5% magnesium carbonate and from about 0.1% to 1% of a deodorant substance comprising phthalic acid, said composition being substantially free from the odor characteristic of rubber and of the odor of the deodorant.

12. An adhesive composition comprising pale crepe rubber, a resin, and a solvent mixture therefor containing a substituted aliphatic ether and a deodorant substance comprising phthalic acid.

13. An adhesive composition comprising from about 60% to 70% pale crepe rubber and about 25% to 35% of a resin dissolved in a solvent mixture therefor containing a small amount of a halogen substituted aliphatic ether.

WILLARD L. MORGAN.